March 30, 1954  J. H. COOMBES  2,673,623
DISK BRAKE UNIT FOR ASSOCIATION WITH CLASP BRAKE TRUCKS
Filed April 4, 1951
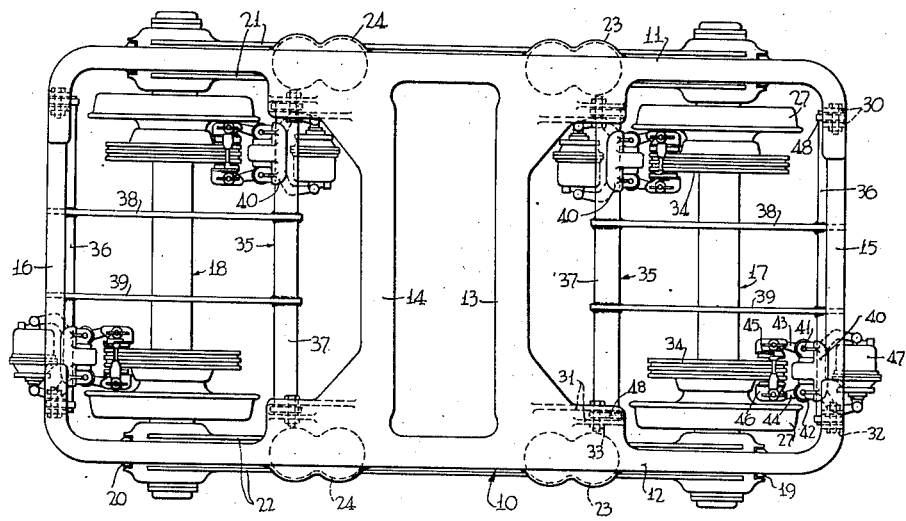
INVENTOR.
Joseph H. Coombes.
BY
Maurice A. Crews
ATTORNEY Patented Mar. 30, 1954

2,673,623

UNITED STATES PATENT OFFICE 2,673,623

DISK BRAKE UNIT FOR ASSOCIATION
WITH CLASP BRAKE TRUCKS

Joseph H. Coombes, Jenkintown, Pa., assignor to
The Budd Company, Philadelphia, Pa., a corporation of Pennsylvania Application April 4, 1951, Serial No. 219,155

2 Claims. (Cl. 188—59)

1

The invention relates to brakes for railway trucks or the like and more particularly to brake mechanism whereby a usual clasp brake supporting truck may readily be converted into a disc brake carrying truck.

As is well known, a railway truck carrying clasp brakes, i. e., brakes in which the shoes are pressed against the opposite sides of a truck wheel or the like to effect the braking, is usually supplied on the opposite sides thereof and disposed on opposite sides of the wheels, with hanger brackets from which the clasp brakes are supported by hangers secured to these brackets by hanger pins.

It is a principal object of the invention to provide a disc brake unit which may readily be substituted in a clasp brake supporting truck for the clasp brakes and their hanger supports, thus facilitating the conversion of existing clasp brake supporting trucks into disc brake carrying trucks.

This object is achieved in large part by providing a subassembled disc brake unit including a brake frame and a disc brake shoe or shoes and actuating means therefor carried thereby, this brake frame having means mating with the hanger brakes of the clasp brake carrying truck, in such fashion that the disc brake frame may be secured to the truck frame by the usual hanger pins for supporting the clasp brakes.

This and other objects and advantages and the manner in which they are attained will become fully apparent from the following detailed description when read in connection with the drawing forming a part of this specification.

In the drawing:

Fig. 1 is a plan view of a usual type of clasp brake carrying truck, showing the disc brake units of the invention applied thereto;

Fig. 2 is a side elevational view of the truck as shown in Fig. 1;

Fig. 3 is a fragmentary side elevational view of a truck equipped with a modified form of the invention; and Fig. 4 is a fragmentary side elevational view of a truck equipped with clasp brakes, with which the disc brake units of the other views are adapted to be interchangeably usable.

The truck with which the invention has been shown associated comprises the usual frame designated generally by numeral 10, having the longitudinal side frames 11 and 12 interconnected by intermediate transoms 13 and 14 and end transoms 15 and 16.

The frame is supported by the usual wheel and axle assemblies 17 and 18 guided for vertical

2 movement by pedestals 19 and 20 adjacent the opposite ends of the side frames, through equalizers 21 and 22 having their upwardly offset ends resting on the tops of the associated journal boxes of the wheel and axle assemblies 17 and 18. Springs 23 and 24 support the frame from the equalizers in the usual manner.

As shown in Fig. 4, the clasp brake shoes, 25 and 26, associated with each wheel, as 27, of a wheel and axle assembly are supported from the truck frame through hangers, designated respectively 28 and 29, these hangers being, in turn, pivoted in brackets 30 and 31, respectively, through the hanger pins 32 and 33 passing through holes in the brackets and hangers.

When it is dsired to convert a clasp brake carrying truck, as shown in Fig. 4, to a disc brake carrying truck, the clasp brakes and their hangers are removed, but the hanger pins 32 and 33 are retained.

A wheel and axle assembly, as 17, carrying a disc brake rotor 34 associated with each wheel 27 of the assembly is then substituted for the usual wheel and axle assembly associated with a clasp brake carrying truck as shown in Fig. 4.

The disc brake unit adapted for substitution on the truck frame for the clasp brakes may comprise, for each wheel and axle assembly, as 17, a generally rectangular brake frame 35.

As clearly shown in Fig. 1, this brake frame 35 consists of two tubular transverse beams 36, 37 disposed, respectively, fore and aft of the adjacent wheel and axle assembly, these beams extending from side to side of the truck frame and being interconnected intermediate their ends by two parallel members 38 and 39. As shown in Fig. 2, these members are bent upwardly to clear the adjacent axle.

Adjacent one end of one beam, as 36, is carried brake mechanism for cooperation with one disc 34 and adjacent the other end of the other beam, as 37, is carried similar mechanism for cooperation with the other disc 34 of the associated wheel and axle assemblies.

Each of these brake mechanisms comprises a bracket 40 secured to the associated transverse member as 36 and pivotally carrying, at 41, 42, intermediate their ends, the brake levers 43 and 44, which carry, at one of their ends, the brake shoes 45 and 46 for cooperation with the associated rotary disc 34, and, at their opposite ends, the actuating cylinder as 47.

In the drawing the brake mechanisms have been arranged on the brake frames 35, so as to have a minimum pitching and rolling effect on the truck frame when the brakes are applied, as taught in copending application Serial No. 182,864 entitled "Brake Arrangement on Sprung-Frame Railway Truck."

Adjacent the ends of the transverse members 36 and 37 of each disc brake unit are provided rigidly secured upwardly extending projections or ears, as 48, one of which is adapted to mate with each of the four hanger brackets 30 and 31 associated with each wheel and axle assembly.

When the disc brake unit so constituted is brought into place on the clasp brake carrying truck frame after the clasp brakes have been removed, it is secured and supported by the usual hanger pins 32, 33 passing through the respective mating ears 48 and brackets 30, 31, as shown in Figs. 1 and 2.

In Fig. 3 is shown a slight modification in which the members 38a and 39a interconnecting the transverse beams 36 and 37 of the disc brake unit are bent downwardly to pass under the axle of the adjacent wheel and axle assembly. Otherwise this form corresponds to the form shown in Figs. 1 and 2.

It will be seen from the foregoing that a very simple disc brake unit has been provided which can be readily applied to a usual clasp brake carrying truck, to convert the same into a disc brake carrying truck, where desired, with a minimum of time and effort involved.

While a specific embodiment of the invention has been herein described in detail, it will be understood that changes and modifications may be made by those skilled in the art without departing from the spirit and scope of the invention as expressed in the appended claims.

What is claimed is:

1. A disc brake unit comprising a truck frame provided with brake frame hanger supports on each side of each wheel position, a wheel and axle assembly carried by the truck frame and having axle journal boxes mounted for vertical movement in the truck frame at each end of the axle, brake discs secured to the wheel-axle assembly between the wheels, one disc adjacent each wheel, a generally rectangular brake frame suspended from said hanger supports and carried wholly on said hanger supports on the truck frame, said brake frame including heavy rigid transverse members outside the wheel treads and longitudinal connecting members extending across the axle between the brake discs, and brake shoes and actuating means therefor carried by said heavy transverse members for cooperation with said brake discs.

2. A disc brake unit comprising a truck frame provided with brake frame hanger supports on each side of each wheel position, a wheel and axle assembly carried by the truck frame and having axle journal boxes mounted for vertical movement in the truck frame at each end of the axle, brake discs secured to the wheel-axle assembly between the wheels, one disc adjacent each wheel, a generally rectangular brake frame suspended from said hanger supports and carried wholly on said hanger supports on the truck frame, said brake frame including heavy rigid transverse members outside the wheel treads and longitudinal connecting members extending across the axle between the brake discs, and brake shoes and actuating means therefor carried by said heavy transverse members for cooperation with said brake discs, said transverse members being tubular and said longitudinal connecting members being welded at their ends to said tubular members and being bent in a vertical plane where they extend across the axle.

JOSEPH H. COOMBES.

References Cited in the file of this patent

UNITED STATES PATENTS

| Number | Name | Date |
|---|---|---|
| 379,983 | Rogers | Mar. 27, 1888 |
| 1,079,357 | Napier et al. | Nov. 25, 1913 |
| 2,276,337 | Pflager | Mar. 17, 1942 |